US012534334B2

(12) United States Patent

Gireddy et al.

(10) Patent No.: US 12,534,334 B2
(45) Date of Patent: Jan. 27, 2026

(54) SELF INTELLIGENT OCCUPANT EVACUATION SYSTEMS

(71) Applicant: Otis Elevator Company, Farmington, CT (US)

(72) Inventors: Jayapal Reddy Gireddy, Telangana (IN); Srinivasa Krishna Mulukutla, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1440 days.

(21) Appl. No.: 17/126,223

(22) Filed: Dec. 18, 2020

(65) Prior Publication Data

US 2021/0188593 A1 Jun. 24, 2021

(30) Foreign Application Priority Data

Dec. 19, 2019 (IN) ............................. 201911052816

(51) Int. Cl.

| | |
|---|---|
| ***B66B 1/28*** | (2006.01) |
| ***B66B 1/34*** | (2006.01) |
| ***B66B 3/00*** | (2006.01) |
| ***B66B 5/00*** | (2006.01) |
| ***B66B 5/02*** | (2006.01) |

(52) U.S. Cl.

CPC .............. *B66B 1/28* (2013.01); *B66B 1/3407* (2013.01); *B66B 3/002* (2013.01); *B66B 5/0012* (2013.01); *B66B 5/024* (2013.01)

(58) Field of Classification Search

CPC ......... B66B 1/28; B66B 3/002; B66B 5/0012; B66B 5/024

See application file for complete search history.

(56) References Cited

U.S. PATENT DOCUMENTS

| | | | | |
|---|---|---|---|---|
| 5,979,607 A * | 11/1999 | Allen ....................... | B66B 5/024 187/390 |
| 7,182,174 B2 * | 2/2007 | Parrini .................... | B66B 5/024 700/83 |
| 7,621,378 B2 * | 11/2009 | Kawai ..................... | B66B 5/024 187/387 |
| 8,113,320 B2 * | 2/2012 | Kawai ..................... | B66B 5/024 187/314 |

(Continued)

FOREIGN PATENT DOCUMENTS

| | | |
|---|---|---|
| CN | 102869593 A | 1/2013 |
| CN | 105016164 B | 8/2019 |

(Continued)

OTHER PUBLICATIONS

Chinese Office Action for Application No. 202011505026.3, Issued Aug. 8, 2022, 6 Pages.

(Continued)

*Primary Examiner* — Rina I Duda

(74) *Attorney, Agent, or Firm* — CANTOR COLBURN LLP

(57) ABSTRACT

According to an embodiment, a method of operating an elevator system during a fire evacuation including: receiving a fire detection from a fire alarm system indicating a fire; detecting a fire intensity using a fire quantity measurement system; and determining a discharge landing for the elevator system in response to at least the fire intensity.

19 Claims, 3 Drawing Sheets

(56) References Cited

U.S. PATENT DOCUMENTS

| | | | | |
|---|---|---|---|---|
| 8,616,339 | B2 * | 12/2013 | Endo | B66B 5/021 187/391 |
| 2009/0050416 | A1 * | 2/2009 | Rotboll | B66B 13/143 187/313 |
| 2009/0314587 | A1 * | 12/2009 | Kawai | B66B 5/024 187/314 |
| 2013/0025973 | A1 * | 1/2013 | Fujihata | B66B 5/022 187/247 |
| 2013/0242074 | A1 * | 9/2013 | Sekiguchi | G06V 40/103 348/77 |
| 2018/0197402 | A1 * | 7/2018 | Zribi | G08B 25/01 |
| 2019/0152746 | A1 | 5/2019 | Chae et al. | |
| 2019/0241400 | A1 | 8/2019 | Zhang et al. | |

FOREIGN PATENT DOCUMENTS

| | | | |
|---|---|---|---|
| JP | 2006193296 | A | 7/2006 |
| KR | 101703190 | B1 | 8/2019 |

OTHER PUBLICATIONS

European Search Report for Application No. 23213148.2, Issued Feb. 28, 2024, 10 Pages.

Indian Office Action for Application No. 201911052816, Issued Dec. 7, 2021, 6 Pages.

* cited by examiner

SELF INTELLIGENT OCCUPANT EVACUATION SYSTEMS

FOREIGN PRIORITY

This application claims priority to Indian Patent Application No. 20191105281, filed Dec. 19, 2019, and all the benefits accruing therefrom under 35 U.S.C. § 119, the contents of which in its entirety are herein incorporated by reference.

BACKGROUND

The subject matter disclosed herein relates generally to the field of elevator systems, and specifically to a method and apparatus for operating an elevator system during a fire evacuation.

Commonly, elevator systems are not involved in evacuating people from a building during a fire evacuation.

BRIEF SUMMARY

According to an embodiment, a method of operating an elevator system during a fire evacuation. The method including: receiving a fire detection from a fire alarm system indicating a fire; detecting a fire intensity using a fire quantity measurement system; and determining a discharge landing for the elevator system in response to at least the fire intensity.

In addition to one or more of the features described herein, or as an alternative, further embodiments may include detecting a people count using a people counter system, the people count being a number of people located on a landing where the fire is located; and determining the discharge landing for the elevator system in response to at least the fire intensity and the people count.

In addition to one or more of the features described herein, or as an alternative, further embodiments may include obtaining weather data using an external weather sensing system; and determining the discharge landing for the elevator system in response to at least the fire intensity and the weather data.

In addition to one or more of the features described herein, or as an alternative, further embodiments may include obtaining weather data using an external weather sensing system; and determining the discharge landing for the elevator system in response to at least the fire intensity and the weather data.

In addition to one or more of the features described herein, or as an alternative, further embodiments may include displaying the discharge landing on a display device located on a landing where the fire is located.

In addition to one or more of the features described herein, or as an alternative, further embodiments may include transporting people from a landing where the fire is located to the discharge landing using an elevator car of the elevator system.

In addition to one or more of the features described herein, or as an alternative, further embodiments may include that detecting the fire intensity using the fire quantity measurement system further includes: detecting thermal data of the fire using a thermal sensor.

In addition to one or more of the features described herein, or as an alternative, further embodiments may include that detecting the fire intensity using the fire quantity measurement system further includes: detecting smoke quantity data of the fire using a smoke quantity sensor.

In addition to one or more of the features described herein, or as an alternative, further embodiments may include that detecting the fire intensity using the fire quantity measurement system further includes: detecting smoke quantity data of the fire using a smoke quantity sensor.

In addition to one or more of the features described herein, or as an alternative, further embodiments may include that detecting the fire intensity using the fire quantity measurement system further includes: determining how many smoke quantity sensors have tripped.

In addition to one or more of the features described herein, or as an alternative, further embodiments may include that detecting the fire intensity using the fire quantity measurement system further includes: determining how many thermal sensors have tripped.

In addition to one or more of the features described herein, or as an alternative, further embodiments may include that detecting the fire intensity using the fire quantity measurement system further includes: determining how many thermal sensors have tripped.

According to another embodiment, an occupant evacuation system for operating an elevator system when a fire is detected by a fire alarm system is provided. The occupant evacuation system including: a fire quantity measurement system configured to detect a fire intensity of the fire; and an analytics engine configured to determine a discharge landing for the elevator system in response to at least the fire intensity.

In addition to one or more of the features described herein, or as an alternative, further embodiments may include an external weather sensing system configured to obtain weather data, wherein the analytics engine is configured to determine the discharge landing for the elevator system in response to at least the fire intensity and the weather data.

In addition to one or more of the features described herein, or as an alternative, further embodiments may include a people counter system configured to detect a people count, the people count being a number of people located on a landing where the fire is located, wherein the analytics engine is configured to determine the discharge landing for the elevator system in response to at least the fire intensity, the weather data, and the people count.

In addition to one or more of the features described herein, or as an alternative, further embodiments may include a people counter system configured to detect a people count, the people count being a number of people located on a landing where the fire is located, wherein the analytics engine is configured to determine the discharge landing for the elevator system in response to at least the fire intensity and the people count.

In addition to one or more of the features described herein, or as an alternative, further embodiments may include a display device configured to display the discharge landing, wherein the display device is located on a landing where the fire is located.

In addition to one or more of the features described herein, or as an alternative, further embodiments may include that the analytics engine is configured transmit the discharge landing to the elevator system, and wherein an elevator car of the elevator system is configured to transport people from a landing where the fire is located to the discharge landing.

In addition to one or more of the features described herein, or as an alternative, further embodiments may include that the fire quantity measurement system further includes at least one of a thermal sensor configured to detect thermal data of the fire and a smoke quantity sensor configured to detect smoke quantity data of the fire.

According to another embodiment, an occupant evacuation system for operating an elevator system when a fire is detected by a fire alarm system is provided. The occupant evacuation system including: a people counter system configured to detect a people count, the people count being a number of people located on a landing where a fire is located; and an analytics engine configured to determine a discharge landing for the elevator system in response to at least the people count.

Technical effects of embodiments of the present disclosure include an apparatus and method to adjust the discharge landing for an elevator system in real time based upon detection and analysis of a fire spreading.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
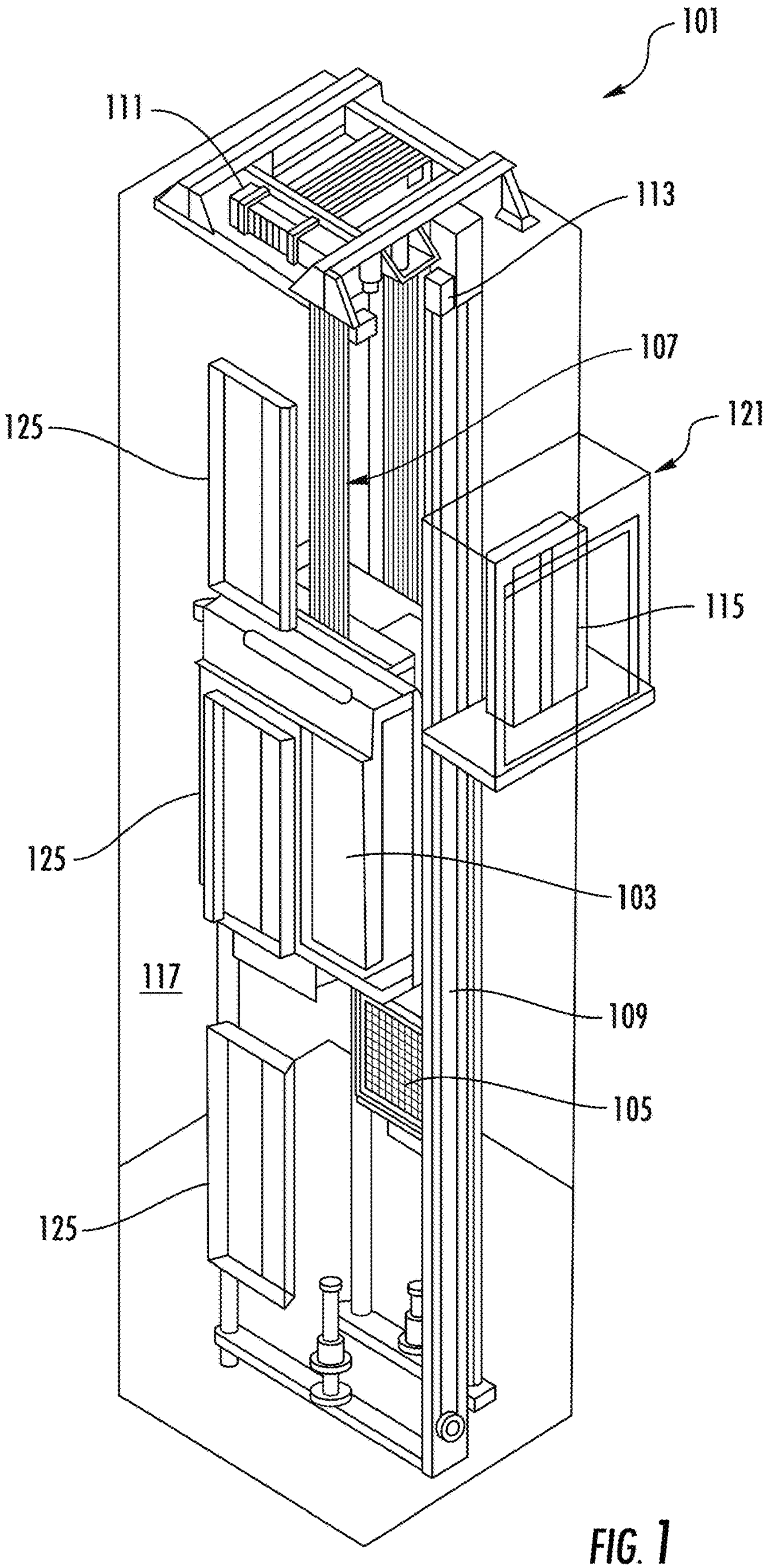
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Figure 2:
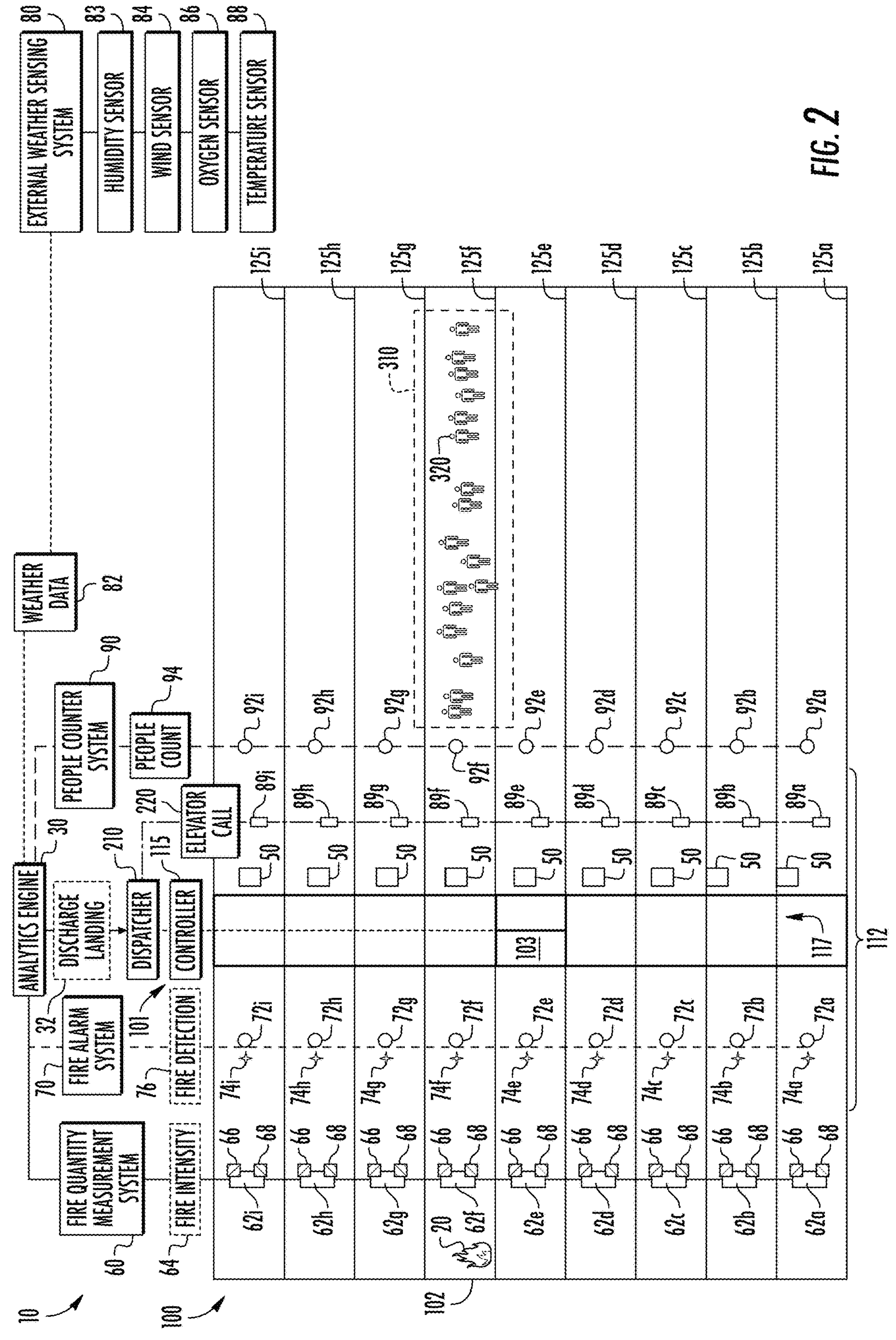
FIG. 2 illustrates a schematic view of an occupant evacuation system for use with the elevator system of FIG. 1, in accordance with an embodiment of the disclosure.

Referring now to FIG. 2 with continued reference to FIG. 1. As seen in FIG. 2, a building elevator system 100 within a building 102 may include one or more elevator systems 101 organized in an elevator group 112 (e.g., elevator banks). It is understood that while one elevator system 101 is utilized for exemplary illustration, embodiments disclosed herein may be applied to building elevator systems 100 having one or more elevator systems 101. It is also understood that while nine landings 125*a*-125*i* are utilized for exemplary illustration, embodiments disclosed herein may be applied to building elevator systems 100 in buildings 102 having any number of landings 125.

Further, the elevator system 101 illustrated in FIG. 2 is organized into a single elevator group 112 for ease of explanation but it is understood that the multiple elevator systems 101 may be organized into one or more elevator groups. The elevator group 112 serves a plurality of landings 125 comprising landings 125*a*-125*i*. It is understood that while the elevator group 112 serves every landing 125*a*-125*i* illustrated within the building 102 for exemplary illustration, embodiments disclosed herein may include elevator group having multiple elevator systems where some elevator systems serve a different range of landings and/or not all the landings 125*a*-125*i* of the building 102.

Each landing 125*a*-125*i* in the building 102 of FIG. 2 may have an elevator call device 89*a*-89*i*. The elevator call device 89*a*-89*i* sends an elevator call 220 to the dispatcher 210 including the source of the elevator call 220. The elevator call device 89-89*i* may include a destination entry option that includes the destination of the elevator call 220. The elevator call device 89*a*-89*i* may be a push button and/or a touch screen and may be activated manually or automatically. For example, the elevator call 220 may be sent by a person 300 entering the elevator call 220 via the elevator call device 89*a*-89*i*. The elevator call device 89*a*-89*i* may also be activated to send an elevator call 220 by voice recognition or a passenger detection mechanism in the hallway, such as, for example a weight sensing device, a visual recognition device, depth sensing device, radar device, a laser detection device, and/or any other desired device capable of sensing the presence of a passenger. The elevator call device 89*a*-89*i* may be activated to send an elevator call 220 through an automatic elevator call system that automatically initiates an elevator call 220 when a person 320 is determined to be moving towards the elevator system in order to call an elevator or when a person 300 is scheduled to activate the elevator call device 89*a*-89*i*. The elevator call device 89*a*-89*i* may also be a mobile device configured to transmit an elevator call 220. The mobile device may be a smart phone, smart watch, laptop, or any other mobile device known to one of skill in the art.

The controller 115 can be local, remote, or cloud based. The dispatcher 210 may be local, remote, or cloud based. The dispatcher 210 is in communication with the controller 115 of the elevator system 101. If there are multiple elevator systems 101 then there may be a controller 115 that is common to all of the elevator systems 101 and controls all of the elevators system 101, a subset of all of the elevator systems 101, or there may be a controller 115 for each elevator system 101. The dispatcher 210 may be a 'group' software that is configured to select the best elevator car 103 assigned to the dispatcher 210. The dispatcher 210 manage the elevator call devices 89*a*-89*i* related to the elevator group 112.

The dispatcher 210 is configured to control and coordinate operation of one or more elevator systems 101. The dispatcher 210 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The dispatcher 210 is in communication with each of the elevator call devices 89*a*-89*i* of the building elevator system 100. The dispatcher 210 is configured to receive each elevator call 220 transmitted from the elevator call devices 89*a*-89*i*. The dispatcher 210 is configured to manage the elevators calls 220 coming in from each elevator call device 89*a*-89*i* and command one or more elevator systems 101 to respond to elevator calls 220.

Also illustrated in FIG. 2 is an occupant evacuation system 10. The occupant evacuation system 10 includes an analytics engine 30, a fire alarm system 70, a fire quantity measurement system 60, a people counter system 90, and an external weather sensing system 80. It should be appreciated that, although particular systems are separately defined in the schematic block diagrams, each or any of the systems may be otherwise combined or separated via hardware and/or software. The analytics engine 30 is in communication with the fire alarm system 70, the fire quantity measurement system 60, the people counter system 90, and the external weather sensing system 80.

The analytics engine 30 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The fire alarm system 70 is configured to report a fire detection 76 to the analytics engine 30. The fire detection 76 may include a location of the fire 20 including the landing 125 where the fire 20 is located. The fire alarm system 70 may include a plurality of fire sensors 72*a*-72*i* configured to detect a fire 20. The fire sensors 72*a*-72*i* may include a smoke detector, a heat sensor, a manual pull fire station, or any similar device known to one of skill in the art. The fire sensors 72*a*-72*i* may be located on each landing 125*a*-125*i* of the building 102. The fire alarm system 70 may also include a plurality of fire alarms 74*a*-74*i* configured to activate an alarm when a fire 20 is detected by the fire sensors 72*a*-72*i*. The alarm produced by the fire alarms 74*a*-74*i* may be audible and/or visual (e.g., flashing lights and/or a siren).

The fire quantity measurement system 60 is configured to determine a fire intensity of the fire 20. The fire intensity may be a measure of the strength and/or size of the fire 20. The fire quantity measurement system 60 includes a fire intensity sensor 62*a*-62*i*. The fire intensity 64 may be detected using the fire intensity sensor 62*a*-62*i*. The fire intensity sensor 62*a*-62*i* may include at least one of a thermal sensor 66 configured to detect thermal data of the fire 20 and a smoke quantity sensor 68 configured to detect smoke quantity data of the fire 20. The thermal sensor 66 and the smoke quantity sensor 68 may continuously or at any interval send fire intensity data 64 to the analytics engine 30. The fire intensity data 64 may include at least one of smoke quantity data and fire intensity data. It is understood that while the fire intensity sensor 62*a*-62*i* is illustrated as a single sensor in FIG. 2, the fire intensity sensor 62a-62i may be composed of multiple sensors (e.g., heat detectors or smoke detectors) in multiple different locations and for example, the first intensity 64 may be based upon a quantity of how many sensors have been tripped (e.g., detect heat or smoke).

The external weather sensing system 80 is configured to obtain weather data 82 external to the building 102. The weather external to the building may affect the spread of the fire 20 internal to the building. For example, high oxygen levels may help fuel the fire and high winds may help spread the fire once the fire is exposed to the wind. The weather data 82 may include, but is not limited to, wind speed, oxygen levels, air humidity, and air temperature. The external weather sensing system 80 may include sensors to detect weather data 82, and/or the external weather sensing system 80 may obtain the weather data 82 from the internet. The external weather sensing system 80 may obtain weather data 82 from any other remote weather information provider known to one of skill in the art. The external weather sensing system 80 may include a humidity sensor 83 configured to detect air humidity, a wind sensor 84 configured to detect wind speed, an oxygen sensor 86 configured to detect oxygen levels, and a temperature sensor 88 configured to detect air temperature.

The people counter system 90 is configured to detect or determine a people count 94. The people count 94 may be a number of people 320 located on a landing 125a-125i or more specifically a number of people 320 located in an elevator lobby 310 on a landing 125a-125i. The people count 94 may be an exact number of people 320 or an approximate number of people. Each landing 125a-125i in the building 102 of FIG. 2 may also include a people counter device 92a-92i. The people counter device 9a-92i may be located proximate the elevator group 112 on each landing 125a-125i. The people counter device 92a-92i may include a camera. The people counter device 92a-92i is may be used to determine the people count 94 proximate the elevator systems 101 and/or within an elevator lobby 310 proximate the elevator systems 101. An elevator lobby 310 is defined as an area located proximate the elevator system 101 on each landing 125a-125i and is not limited to the landing 125f, as illustrated in FIG. 2. The people count 94 may include number of people 320 located in the elevator lobby 310. People 320 being located proximate the elevator system 101 and/or within the elevator lobby 310 is indicative that the people 320 would like to board an elevator car 103 of the elevator system 101 to evacuate the building 102.

The people counter device 92a-92i may include one or more detection mechanisms in the elevator lobby 310, such as, for example a weight sensing device, a visual recognition device, depth sensing device, radar device, a laser detection device, mobile device (e.g., cell phone) tracking, and/or any other desired device capable of sensing the presence of people 320. The visual recognition device may be a camera that utilizes visual recognition to identify individual people 320 and objects in elevator lobby 310. The weight detection device may be a scale to sense the amount of weight in an elevator lobby 310 and then determine the number of people 320. The laser detection device may detect how many passengers walk through a laser beam to determine the number of people 310 in the elevator lobby 310. The thermal detection device may be an infrared or other heat sensing camera that utilizes detected temperature to identify individual people 320 and objects in the elevator lobby 310 and then determine the number of people 320. The depth detection device may be a 2-D, 3-D or other depth/distance detecting camera that utilizes detected distance to an object and/or people 320 to determine the number of passengers. The mobile device tracking may determine a number of people on a landing 125 or an in elevator lobby 310 by tracking mobile device wireless signals and/or detecting how many mobile devices are utilizing a specific application on the mobile device within the building 102 on the landing 125 or in the elevator lobby 310. As may be appreciated by one of skill in the art, in addition to the stated methods, additional methods may exist to sense the number of people 320 and one or any combination of these methods may be used to determine the number of people 320 in the elevator lobby 310 or on the landing 125.

In one embodiment, the people counter device 92a-92i is able to detect the people count 94 through image pixel counting. The people count 94 may compare a current image of the elevator lobby 310 to a stock image of the elevator lobby 310. For example, the people counter device 92a-92i may utilize pixel counting by capturing a current image of the elevator lobby 310 and comparing the current image of the elevator lobby 310 to a stock image of the elevator lobby 310 that illustrates the elevator lobby 310 with zero people 320 present or a known number of people 320 present. The number of pixels that are different between the stock image of the elevator lobby 310 and the current image of the elevator lobby 310 may correlate with the people count 94 within the elevator lobby 310. It is understood that the embodiments disclosed herein are not limited to pixel counting to determine a people count 94 and thus a people count 94 may be determined utilizing other method including but not limited to video analytics software. Video analytics may identify people 300 from stationary objections and count each person separately to determine a total number of people 300.

The people count 94 may be determined using a machine learning, deep learning, and/or artificial intelligence module. The artificial intelligence module can be located in the people counter device 92a-92i or in a separate module in the elevator lobby 310 or on the landing 125. The separate module may be able to communicate with the people counter device 92a-92i. The people count 94 may alternatively be expressed as a percentage from zero-to-one-hundred percent indicating what percentage of pixels are different between the stock image of the elevator lobby 310 and the current image of the elevator lobby 310. The people count 94 of the elevator lobby 310 may be expressed as a scale of one-to-ten (e.g., one being empty and ten being full) indicating what percentage of pixels are different between the stock image of the elevator lobby 310 and the current image of the elevator lobby 310. The people count 94 may be expressed as an actual or estimated number of people 320, which may be determined in response to the number of pixels that are different between the stock image of the elevator lobby 310 and the current image of the elevator lobby 310.

The fire alarm system 70 is configured to transmit the fire detection 76 to the analytics engine 30. The fire quantity measurement system 60 is configured to transmit the fire intensity 64 to the analytics engine 30. The external weather sensing system 80 is configured to transmit the weather data 82 to the analytics engine 30. The people counter device 92a-92i is configured to transmit the people count 94 to the analytics engine 30. The analytics engine 30 is configured to receive the fire detection 76, the fire intensity 64, the people count 94, and the weather data 82. The analytics engine 30 is configured to determine a discharge landing 32 in response to at least one of the fire detection 76, the fire intensity 64, the people count 94, and the weather data 82.

In one embodiment, the analytics engine 30 is configured to determine a discharge landing 32 in response to at least the fire intensity 64. In another embodiment, the analytics engine 30 is configured to determine a discharge landing 32 in response to at least the people count 94. The analytics engine 30 is configured to transmit the discharge landing 32 to the dispatcher 210 and/or the controller 115 of the elevator system 101. The dispatcher 210 may relay the discharge landing 32 to the controller 115. The controller 115 is configured to adjust operation of the elevator system 101 in response to the discharge landing 32.

The discharge landing 32 may change based upon the fire detection 76, the fire intensity 64, the people count 94, and the weather data 82. For example, if the fire 20 is spreading quickly then the elevator system 101 may not have enough time to take people all the way to the bottom landing 125*a* (e.g., a first discharge landing, original discharge landing, or standard discharge landing) and thus the discharge landing 32 may move closer to the landing 125 (e.g., a second discharge landing) where the fire 20 was detected in order to make shorter trips to the new discharge landing 32 to evacuate more people 320 away from the fire 20. Once safely away from the fire 20 people 320 may then utilize stairs to completely evacuate the building 102. In an embodiment, the analytic engine 30 may implement a handicap mode to override the current discharge landing 32 and transport handicap passenger directly to a landing 125*a* at the bottom of the building 102.

The occupant evacuation system 10 may also include a display device 50. There may be a display device 50 located on each landing 125*a*-125*i* proximate the elevator system 101. The analytics engine 30 is configured to transmit the discharge landing 32 to the display device 50. The display 50 is configured to receive the discharge landing 32 from the analytics engine 30 and visually display the discharge landing 32. Advantageously, this will allow people 320 to know what landing 125 they will be traveling to prior to entering the elevator car 103. The display 50 may also be configured to visually display how long (e.g., a countdown time) until each elevator car 103 of each elevator system 101 arrives at each landing 125*a*-125*i*. Advantageously, the display devices 50 will allow people 320 waiting in the elevator lobby 310 to know which elevator cars 103 will arrive soon and thus the people can crowd around the correct elevator system 101 if there is more than one elevator system 101. The display device 50 may also be utilized to provide a people count 94 in real time. The people count 94 may be continuously updated or updated at a selected interval. The display device 50 may also allow people 320 to update the people count 320 manually. The display device 50 may also allow people 320 to activate a handicap mode as aforementioned.

Figure 3:
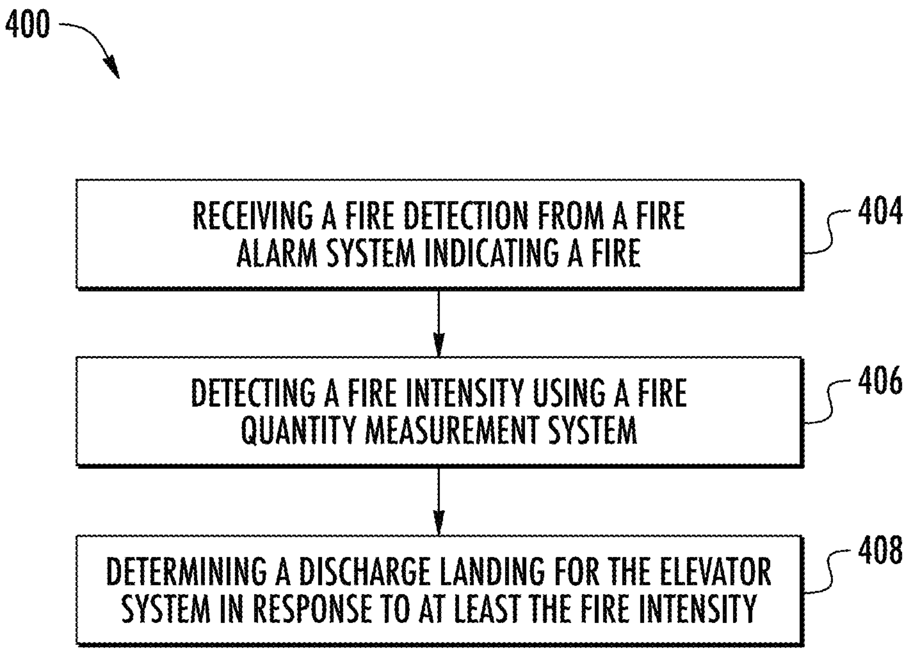
FIG. 3 is a flow chart of method operating an elevator system during a fire evacuation, in accordance with an embodiment of the disclosure.

Referring now to FIG. 3, while referencing components of FIGS. 1 and 2. FIG. 3 shows a flow chart of method 400 of operating an elevator system 101 during a fire evacuation, in accordance with an embodiment of the disclosure. In an embodiment, the method 400 may be performed by the occupant evacuation system 10 and/or the analytics engine 30.

At block 404, a fire detection 76 from a fire alarm system 70 indicating a fire is received. At block 406, a fire intensity 64 is detected using a fire quantity measurement system 60. The fire intensity 64 may be detected using a fire intensity sensor 62*a*-62*i*. The fire intensity sensor 62*a*-62*i* may include a thermal sensor 66 configured to detect thermal data, a smoke quantity sensor 68 configured to detect smoke quantity data, or some combination thereof. At block 408, a discharge landing 32 for the elevator system 101 is determined in response to at least the fire intensity 64.

The method 400 may further comprise that weather data 82 is obtained using an external weather sensing system 80 and the discharge landing 32 for the elevator system 101 is determined in response to at least the fire intensity 64 and the weather data 82.

The method 400 may further comprise that a people count 94 is obtained using a people counter system 90 and the discharge landing 32 for the elevator system 101 is determined in response to at least the fire intensity 64, the weather data 82, and the people count 94. The people count 92 being a number of people 320 located on a landing 125 where the fire 20 is located. The discharge landing 32 for the elevator system 101 may also be determined in response to at least the fire intensity 64 and the people count 94. The method 400 may further comprise displaying the discharge landing 32 on a display device 50 located on a landing 125 where the fire 20 is located.

The method 400 may additionally comprise that analytics engines 30 transmits the discharge landing 32 to the controller 115 of the elevator system 101 and the controller 115 instructs the elevator system 101 to transport people 320 from a landing 125 where the fire 20 is located to the discharge landing 32 using an elevator car 103 of the elevator system 101.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating an elevator system during a fire evacuation, the method comprising:
- receiving a fire detection from a fire alarm system indicating a fire;
- detecting a fire intensity using a fire quantity measurement system; and
- determining a discharge landing for the elevator system in response to at least the fire intensity
- wherein the fire intensity is based on a number of fire intensity sensors in the fire quantity measurement system that have detected heat or smoke;
- wherein the discharge landing is changed based on the fire detection, the fire intensity and a people count.

2. The method of claim 1, further comprising:
- detecting the people count using a people counter system, the people count being a number of people located on a landing where the fire is located.

3. The method of claim 2, further comprising:
- obtaining weather data using an external weather sensing system; and
- determining the discharge landing for the elevator system in response to at least the fire intensity and the weather data.

4. The method of claim 1, further comprising:
- obtaining weather data using an external weather sensing system; and
- determining the discharge landing for the elevator system in response to at least the fire intensity and the weather data.

5. The method of claim 1, further comprising:
- displaying the discharge landing on a display device located on a landing where the fire is located.

6. The method of claim 1, further comprising:
- transporting people from a landing where the fire is located to the discharge landing using an elevator car of the elevator system.

7. The method of claim 1, wherein detecting the fire intensity using the fire quantity measurement system further comprises:
- detecting thermal data of the fire using a thermal sensor.

8. The method of claim 7, wherein detecting the fire intensity using the fire quantity measurement system further comprises:
- detecting smoke quantity data of the fire using a smoke quantity sensor.

9. The method of claim 1, wherein detecting the fire intensity using the fire quantity measurement system further comprises:
- detecting smoke quantity data of the fire using a smoke quantity sensor.

10. The method of claim 1, wherein detecting the fire intensity using the fire quantity measurement system further comprises:
- determining how many smoke quantity sensors have tripped.

11. The method of claim 10, wherein detecting the fire intensity using the fire quantity measurement system further comprises:
- determining how many thermal sensors have tripped.

12. The method of claim 1, wherein detecting the fire intensity using the fire quantity measurement system further comprises:
- determining how many thermal sensors have tripped.

13. An occupant evacuation system for operating an elevator system when a fire is detected by a fire alarm system, the occupant evacuation system comprising:
- a fire quantity measurement system configured to detect a fire intensity of the fire; and
- an analytics engine configured to determine a discharge landing for the elevator system in response to at least the fire intensity;
- wherein the fire intensity is based on a number of fire intensity sensors in the fire quantity measurement system that have detected heat or smoke;
- wherein the discharge landing is changed based on the fire detection, the fire intensity and a people count.

14. The occupant evacuation system of claim 3, further comprising:
- an external weather sensing system configured to obtain weather data, wherein the analytics engine is configured to determine the discharge landing for the elevator system in response to at least the fire intensity and the weather data.

15. The occupant evacuation system of claim 14, further comprising:
- a people counter system configured to detect the people count, the people count being a number of people located on a landing where the fire is located, wherein the analytics engine is configured to determine the discharge landing for the elevator system in response to at least the fire intensity, the weather data, and the people count.

16. The occupant evacuation system of claim 13, further comprising:
- a people counter system configured to detect the people count, the people count being a number of people located on a landing where the fire is located, wherein the analytics engine is configured to determine the discharge landing for the elevator system in response to at least the fire intensity and the people count.

17. The occupant evacuation system of claim 13, further comprising:
- a display device configured to display the discharge landing, wherein the display device is located on a landing where the fire is located.

18. The occupant evacuation system of claim 13, wherein the analytics engine is configured transmit the discharge landing to the elevator system, and wherein an elevator car of the elevator system is configured to transport people from a landing where the fire is located to the discharge landing.

19. The occupant evacuation system of claim 13, wherein the fire quantity measurement system further comprises at least one of a thermal sensor configured to detect thermal data of the fire and a smoke quantity sensor configured to detect smoke quantity data of the fire.

* * * * *